Jan. 18, 1966  R. T. ERBAN  3,229,570
PROJECTION MICROSCOPE
Filed July 21, 1960
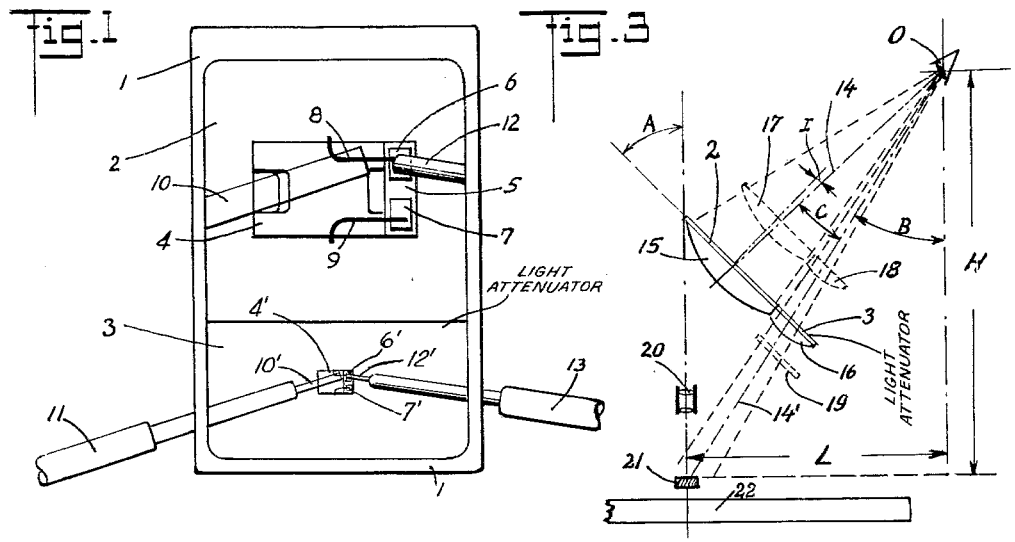
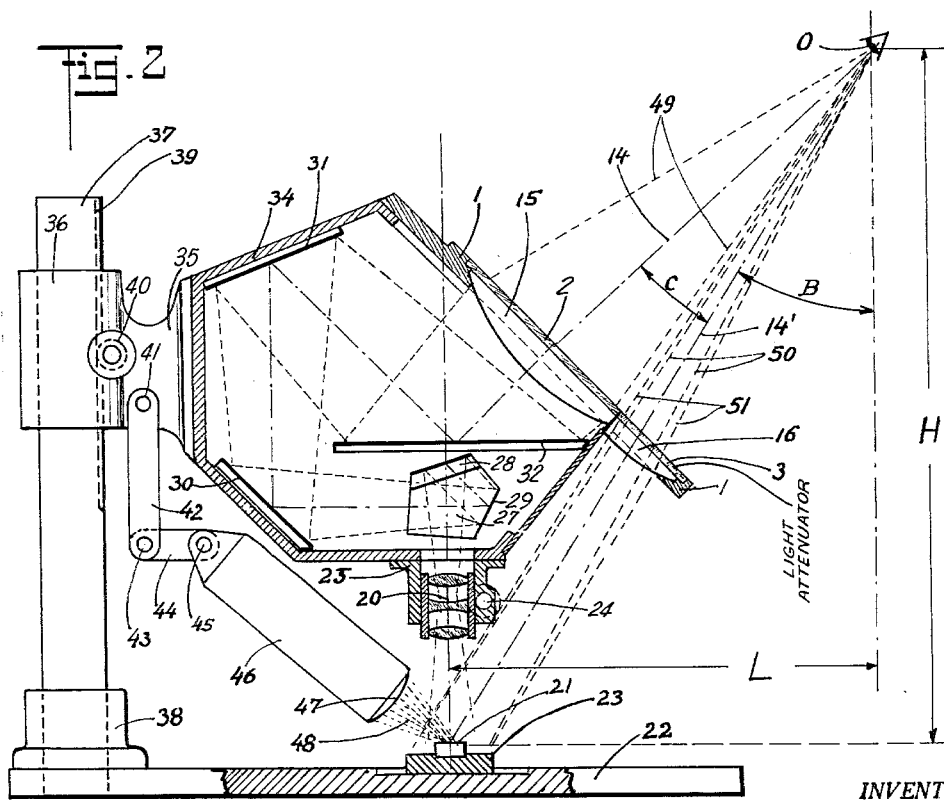
INVENTOR.
RICHARD T. ERBAN
BY
Edmund N. Squire
Atty.

United States Patent Office 3,229,570
Patented Jan. 18, 1966

3,229,570
PROJECTION MICROSCOPE
Richard T. Erban, 145—38 Bayside Ave.,
Flushing, N.Y.
Filed July 21, 1960, Ser. No. 44,401
8 Claims. (Cl. 88—24)

The present invention relates to an optical instrument for the close observation of small objects on an enlarged scale in such manner that observation may be performed with ease and precision by an observer from random positions within a large range of working positions.

One of the objects of my invention comprises an optical magnifying instrument which enables the operator to perform various manual operations upon the small object and to carry out such operations while simultaneously performing the required steps of manipulation by observation of the magnified image which is projected on the viewing screen of the instrument. The instrument includes a structure which makes visible simultaneously within the same field of observation at least two different views of the small part and the tools which are working thereupon, both views being oriented in the same direction and one of the views being magnified with respect to the other, without requiring a shifting of the head of the operator to different positions in order to observe the different views. The structure is such that the operator is aware of the plurality of views of the small object without any conscious effort on his part, and as a result, the building up of muscular strain and eye fatigue even during prolonged use of the instrument is avoided.

In one of the preferred embodiments of my invention I arrange two different views of the observed parts at different magnifications closely positioned to each other with the view of higher magnification at the upper portion of the viewing field and the view with the lower magnification at the lower portion of the viewing field. For the purposes of general application, the magnification of the lower portion of the viewing field is selected between substantially 0.7 diameter and 5 diameters or magnification may be omitted. The upper portion of the viewing field may provide for a magnification of from 5 diameters to 50 diameters or more.

Another aspect of my invention contemplates an instrument of the kind above referred to, which comprises means adapted to enhance the inherent visual acuity of the eye of the operator and thereby produce a substantial increase of the effective resolving power of the instrument without an increase in magnification.

Various additional objects, features and advantages of the invention will become apparent upon reading the following specification together with the accompanying drawing forming a part hereof.

Referring to the drawing:

FIGURE 1 is a plan view of the viewing field of an instrument embodying the invention looking at the viewing field from the point "0" in FIG. 2.

FIGURE 2 is a side elevational view, partly in section and on a reduced scale, of the instrument, the viewing field of which is shown in FIG. 1.

FIGURE 3 is a diagram illustrating the permissible ranges for the positioning of the optical elements of the instrument with respect to each other and with respect to the eyes of the operator.

Referring to FIG. 1, a frame 1 supports the viewing field which comprises an upper portion 2 and a lower portion 3.

It will be seen that the instrument simultaneously presents to the operator two views 4 and 4' of the same object. The upper view is highly magnified and shows the object on a scale which may be chosen between about 5 and 100 diameters. The lower view 4' is usually magnified at a scale between 0.6 and 3 diameters, and for many applications it will be satisfactory to use a magnification of substantial unity, i.e. it will show the object as seen directly by the eye. FIG. 1 also illustrates one of the important features of the new structure, that is, the contiguous positioning of the two views relative to each other in such close proximity, that they may be observed like component parts of one picture, which can be observed in its entirety by the eyes of the operator without any conscious effort on his part, thus avoiding fatigue and eye strain. While the center upon which the eyes are focused may shift from one view to the other very rapidly, such movements of the eyeball are accomplished practically effortlessly provided the subtended angle determined by the eye and the two centers of attention does not exceed a certain predetermined value. That the eye sweeps almost automatically over small angles is apparent in reading where the eye sweeps ahead of the point which at that instant is consciously perceived by the brain.

I have found that the eye can coordinate, or observe fairly simultaneously, two points of attention provided the subtended angle between them is not much over 27°. An angle of 30° subtended between the two points under observation causes strain for any normal eye (i.e. not specially trained for such observation) since it requires a conscious effort to pivot the eyeball between the two positions. Still larger angles require a change in the position of the head of the operator, which introduces more muscular strain and a considerable time loss, so that a quasi-simultaneous observation of both points is out of the question.

It is therefore essential that the view showing the object at a greatly magnified scale appears to the eye within the stated limits of the subtended angle from the view of low magnification (between 0.6 and 3) which is on the direct line of sight from the eye to the object itself. Since the natural coordination between eyes and hands of the operator, in the absence of a special training, is an automatic reaction to the directly observed position and movements of the object and the tools which are brought to bear upon it, it is clear that the information received by the eyes from observing the enlarged view 4 will produce a response in the movement of the hands directing the tools by natural reflexes. These movements are therefore carried out without any hesitation or feeling of uncertainty. Strain and fatigue during prolonged periods of continuous work are greatly reduced.

It must also be pointed out that the eyes of the operator, even when looking at the enlarged view, are looking within close limits in the direction of the object being worked on, so that the awkward feeling which comes from having the hands working upon an object that lies in one direction while looking in a different direction, is completely eliminated. The manner in which the proximity of the two views and their best relative position with respect to the eyes and hands of the operator are achieved is illustrated in FIGS. 2 and 3.

Referring once more to FIG. 1, it shows a small electrical component positioned for a soldering operation. The part 4 has on its end a small strip of insulating material 5 which carries two very small contact plates 6 and 7. The part 4 (a small speaker magnet) contains a coil whose two ends 8 and 9 are to be soldered to the contacts 6 and 7. In order to obtain reliable contact, the proper flowing and wetting of the solder must be obtained. Proper observation requires a magnification of 8–10 diameters, since the wire is rather thin (0.001"). FIG. 1 illustrates how the approximate positioning of the tools is clearly seen in the lower viewing field defined by the illumination attenuating plate 3. The tool 11 at the left serves to hold the wire 8 in position while the soldering iron 12 is applied to it. All details of the soldering process are clearly observed in the upper viewing field 2, and the extremely small and delicate movements of the tools are carried out by observation of the magnified view, the direct view 4' being within the range of peripheral perception of the operator.

The basis structure by which the foregoing performance of the instrument is obtained, is illustrated in FIG. 2. A small object 21 is held in suitable position by a stage 23 which is mounted upon a base plate 22. An optical lens system 20 is mounted above the stage in a manner which permits vertical adjustment of the lens system by means of a focusing knob 24, supported by the lens mount 25. A housing 34 carries at its bottom the lens mount 25 and inside the housing directly above the lens system 20 is positioned a prism 27 which is of the type known as a "Penta-Roof" prism. The projection beam emanating from the lens system 20 impinges first upon the Roof (Amici) surfaces 28 which constitutes the part of an image erecting device which reverses right and left in the projected image. The beam is then reflected by the mirror surface 29 of the prism and leaves the prism substantially at right angles to the optical axis of the lens system 20. The beam then impinges upon the mirror 30 which directs it upwardly towards the mirror 31. Reflection by this last mirror directs the beam towards the mirror 32 which in turn reflects the beam in the direction of the field lens 15 which is adjacent to, or may form part of the translucent projection or viewing screen 2 which corresponds to the upper portion of the viewing field 2 of FIG. 1. This projected image is viewed by the eyes of the observer positioned substantially at a predetermined viewing position designated 0. The illumination of the brightly illuminated object 21 is provided by a high intensity light beam 48 which emanates from a lens 47 that is part of a lamp and condenser system 46. The housing 34 which encloses the optical system is supported by a mount 35 which is vertically adjustable by a sliding movement of the sleeve 36 upon the column 37, controlled by the rack and pinion system 39–40.

Connected to the mount 35 through the adjustable linkage 41–42–43–44–45 is the high intensity illuminator 46 which produces the light beam 48. The projection screen 2 of the upper viewing field is a glass plate having a thin light scattering layer suitable to make the projected image visible to the eyes of the operator positioned at or near the point marked 0. Adjacent to the plate 2 is the plate 3 which is made of light attenuating, but not light scattering material. The degree of light absorption or attenuation is so selected that the average brightness of the image as seen in the lower field defined by plate 3 is between substantially 0.25 and 4.0 times the average brightness of the image in field 2. The light attenuating member 3 causes the intensity of illumination of the object 21 when viewed through the direct viewing path from 0 to 21 (view 4') to be compatible with the intensity of illumination of the view 4 which is the enlarged projected image. Without the light attenuating member 3, the brightly illuminated object 21 would tend to be blinding when viewed in view 4'. Instead of using a light filter with a fixed ratio of absorption, an adjustable filter may be used, such as adjustable Polaroid filters or other known systems, which will permit the brightness of field of plate 3 to be adjusted to a value within the indicated range or, possibly, a preferred value. FIG. 2 also shows a lens 16 positioned adjacent to attenuating plate 3. Such a lens is used in cases where the object 21 is so small that even for direct viewing it is desirable to employ a slight magnification of between one and three or four diameters. The lens 16 is so positioned that its optical center is in alignment with the direct line of sight from point 0 to the object 21. In the case of larger objects 21, it may be desirable to reduce the size of the direct view by using for the lens 16 a negative lens of between 0.6 and 1.0 magnification. In a great many applications, particularly where the magnification of field 2 is between 5 and 15 diameters the lens 16 may be omitted.

The position of the eyes of the operator relative to the small object 21 is defined by the height H of the eyes above the object 21 and by the horizontal distance L from the center of the object 21 to a vertical plane which is tangent to the observer's eyes at 0. These same dimensions apply to the diagram of FIG. 3, where all essential elements of FIG. 2 are shown in their relative positions with respect to each other.

In all cases where hand tools are to be applied to the small object 21, it is important that the hands and the arms of the operator are in a comfortable position, which produces a minimum of fatigue, and that at the same time the eyes and the head of the operator can easily be held within the permissible range of positions for clear perception of both viewing fields. While it is true that almost any position may be held by an operator for a short period of time, it has been found that instruments based upon short-run tests have later proved inadequate and failed in continuous production of work, because the initially high fatigue factor increases progressively and causes human error, and the resulting number of rejected parts produced increases beyond acceptable limits.

I have found in prolonged tests carried out under actual working conditions that an optimum situation exists for the dimensions H and L. The height H may vary between 14 and 19 inches with an average of 17 inches, while the distance L may be chosen between 7 and 15 inches with an optimum of about 11 inches. In accordance with these tests, optimum working conditions are obtained if the angle B is selected between 23° and 45° and the angle C from 15° to about 25°. Under these conditions the angle A of the viewing field 2 to the vertical is substantially between 20° and 50°.

The distance between the eyes at 0 and the viewing surface 2 must correspond to the optimum reading distance for normal eyes, that is 10–12 inches, unless corrective eyeglasses are used. This distance may be shortened by placing a lens with a focal length of between 6 and 15 inches in the position indicated by dotted lines at 17, FIG. 3. The angle of the line of sight from the eye position at 0 to the center of the viewing field 2 may deviate somewhat from 90° without causing eye discomfort. In other words, the angle of incidence I between the line of sight 14 and the vertical to the plane 2 may be around 12°, and in that case the angle A will be greater than $90° - (B+C)$.

In a similar manner, the line of sight from the eyes at 0 to the object 21 may form with the plane of the field 3, or with the plane surface of the lens 16, an angle deviating from 90°, as illustrated in FIG. 3, without causing any displacement of the image of the object 21 as seen through the lens 16, provided that the optical center of the lens 16 is aligned with the line of sight 14'. FIG. 2 also illustrates how, without the lens 16, the directly viewed image of the positioning stage 23 is subtended by the lines of sight 50—50; while with the lens 16 in position, the image of the stage 23 is subtended by the lines 51—51, so that the stage 23 and the small object placed upon it appear slightly enlarged and proportionately nearer to the eyes at 0. Thus, the lens 16 serves to reduce the amount of focusing adjustment required by the operator's eyes when shifting from observation of view 2 to view 3 or vice versa. The requirements for changing the eye focus can further be reduced by providing a plano-convex lens 17 between the eyes at 0 and the viewing field 2. A further plano-convex lens 18, placed with its optical center upon the central line of sight 14' as shown in FIG. 3, between the plane of the field 2 and the eye location at 0, serves to bring the image appearing in the field 3 substantially within the same plane as the image appearing in the field 2. In this case, the lens 16 can be omitted and the light attenuating plate 3 may be moved to some other position along the line of sight. A suitable position is indicated by the position marked 19 in FIG. 3.

In accordance with the optimum working distances for the hands of the operator and the best reading distances for the normal eye, the optimum angle B is found from $$\tan B = \frac{L}{H}$$

and

B from 23 to 45° as before mentioned. The practical limits for the angle C have been stated to be from 15 to 27°, so that the angle A will be found as $$A = 90° - (B+C) + I$$

where I is the deviation of the angle of incidence of the line of sight 14 on field 2 from 90°.

The sectional view of FIG. 2 shows all of the elements of the instrument substantially in optimum relative position for a normal operator and with the dimensions H and L within the ranges above mentioned. It is found that in view of the limitations placed on the angle C, the position and inclination (angle A) of the viewing field are likewise limited to a very narrow range, of which FIG. 2 illustrates a preferred arrangement for a size of 5" by 5" for the viewing field 2. It must also be noted that a free working space of several inches surrounding the object 21 must be maintained to permit easy access for the tools and for the hands of the operator. In order to provide the space required for the projection beam from the lens 20 to the viewing field 2, the last mirror 32 is placed with its front edge near the lower edge of the viewing field 2 and with the reflecting surface of mirror 32 extending substantially horizontally towards the rear. Directly below the mirror 32 is positioned the prism 27 which causes a deflection of the vertical beam emanating from the lens system 20 of substantially 90° toward the rear. It is also seen that the optical axis of the lens system 20, if extended vertically upwardly, passes closely adjacent to the upper edge of the viewing field 2.

The view of FIG. 2 therefore discloses that the relative positions of the objective lens system 20, the viewing screen 2 and the mirror 32 are closely interrelated and may not be arbitrarily altered if the desired performance of the instrument is to be obtained. The positions of the mirrors 30 and 31 may be altered within a wide range without interfering with the performance of the instrument, and the Panta-Roof prism 27 may be replaced by a mirror or a right angle prism provided other means are provided for inverting right and left.

In order to achieve image erection by reflective means, a total of four reflective surfaces is necessary, as is well known. Inspection of FIG. 2 will disclose that for a projection system according to this invention, having the objective lens system 20, the projection screen 2 and the mirror 32 within the stipulated limits of relative position, it is impossible to obtain full image erection with four reflective surfaces; a minimum number of six reflective surfaces must be employed regardless of the sequence of their arrangement in the projection beam and regardless of whether the prism 27 is a Penta-Roof prism as shown, a straight Amici, or a simple 90° prism.

While I have shown and described what I believe to be the best embodiments of my invention, it will be apparent to those skilled in the art that various modifications may be made therein without departing from the spirit and scope of the invention as defined in the appended claims.

What is claimed is:

1. Magnification apparatus comprising: stage means for supporting an object, said stage means being positioned for the convenient performance of steps of manipulation on said object by an operator with the eyes of the operator positioned at a predetermined viewing position wherein said object is directly observable through a direct viewing path; high intensity illumination means causing said object to be brightly illuminated; projection microscope means comprising objective lens means positioned to receive light from said illuminated object and a translucent viewing screen upon which an enlarged image of said object is projected, said viewing screen having an edge portion substantially contiguous with an edge portion of said direct viewing path, said screen being so positioned that, if extended past said contiguous edge portions, it would intercept said viewing path substantially perpendicularly, said microscope means further comprising image erecting means causing said enlarged image to be oriented in all respects in the same direction as said object when observed through said direct viewing path; and light attenuating means interposed in said direct viewing path, said attenuating means causing the intensity of illumination of said brightly illuminated object when observed through said direct viewing path to be compatible with the intensity of illumination of said enlarged image.

2. Magnification apparatus according to claim 1, further comprising magnifying means interposed in said direct viewing path.

3. Magnification apparatus according to claim 1, wherein two lines, one extending from said viewing position to the center of said stage and the other extending from said viewing position to the center of said screen diverge by an angle not exceeding 25 degrees, whereby when said operator is concentrating his attention on the projected image, the object, as observed through said direct viewing path, remains within the range of peripheral perception of the operator.

4. Magnification apparatus according to claim 1, wherein said contiguous edge portions extend horizontally, said viewing screen being disposed above said direct viewing path.

5. Magnification apparatus comprising: stage means for supporting an object, said stage means being positioned for the convenient performance of steps of manipulation on said object by an operator with the eyes of the operator positioned at a predetermined viewing position wherein said object is directly observable through a direct viewing path; high intensity illumination means causing said object to be brightly illuminated; projection microscope means comprising objective lens means positioned to receive light from said illuminated object and a translucent viewing screen upon which an enlarged image of said object is projected, said viewing screen having an edge portion substantially contiguous with an edge portion of said direct viewing path, said screen being so positioned that, if extended past said contiguous edge portions, it would intercept said viewing path substantially perpendicularly, said microscope means further comprising an opaque mirror for reflecting light directly toward said screen, said mirror extending across the optical axis of said objective lens means, said mirror being inclined with respect to said screen and having an edge portion disposed in proximity to said contiguous edge portions; reflecting means receiving light from said objective lens means and directing said light around and upon said mirror, said reflecting means including at least one reflecting surface disposed between said objective lens means and said mirror, said reflecting means comprising a plurality of cooperating reflecting surfaces causing said enlarged image to be oriented in all respects in the same direction as said object when observed through said direct viewing path; and light attenuating means interposed in said direct viewing path, said attenuating means causing the intensity of illumination of said brightly illuminated object when observed through said direct viewing path to be compatible with the intensity of illumination of said enlarged image.

6. Magnification apparatus according to claim 5, further comprising magnifying means interposed in said direct viewing path.

7. Magnification apparatus according to claim 5, wherein two lines, one extending from said viewing position to the center of said stage and the other extending from said viewing position to the center of said screen diverge by an angle not exceeding 25 degrees, whereby, when said operator is concentrating his attention on the projected image, the object, as observed through said direct viewing path, remains within the range of peripheral perception of the operator.

8. Magnification apparatus according to claim 5, wherein said contiguous edge portions extend horizontally, said viewing screen being disposed above said direct viewing path.

References Cited by the Examiner

UNITED STATES PATENTS 1,934,582  11/1933  Bausch et al. _____ 88—24

FOREIGN PATENTS 11,337  2/1933  Australia.
889,499  10/1943  France.

LEO SMILOW, *Primary Examiner.*

EMIL G. ANDERSON, *Examiner.*